H. M. & A. A. BOWSER.
MEASURING PUMP.
APPLICATION FILED FEB. 13, 1907.
1,068,561.
Patented July 29, 1913.
6 SHEETS—SHEET 4.
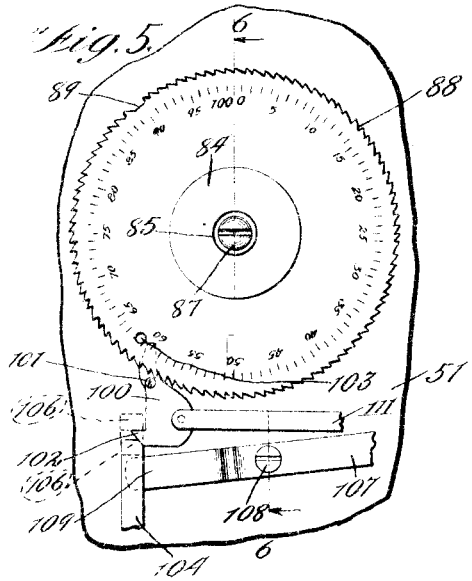
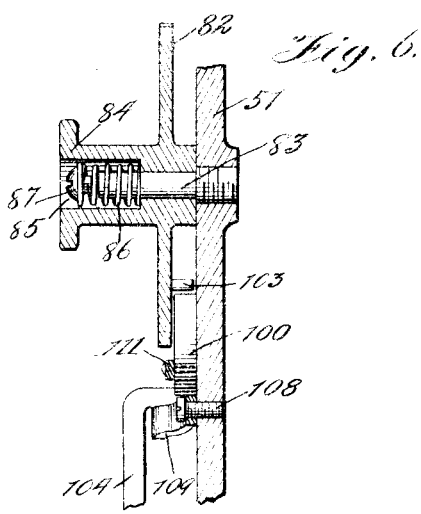
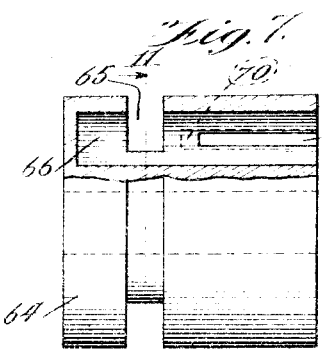
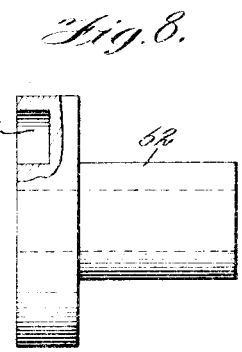
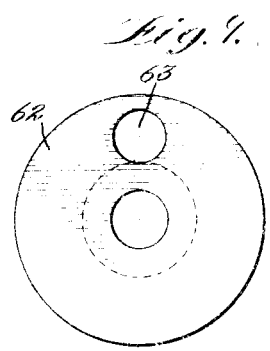
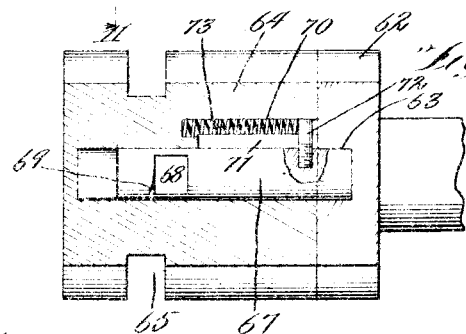
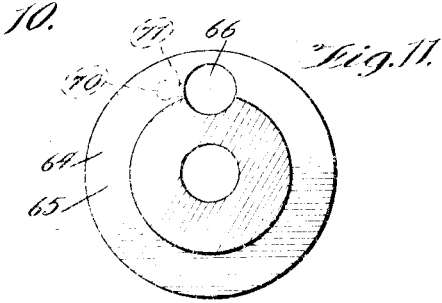

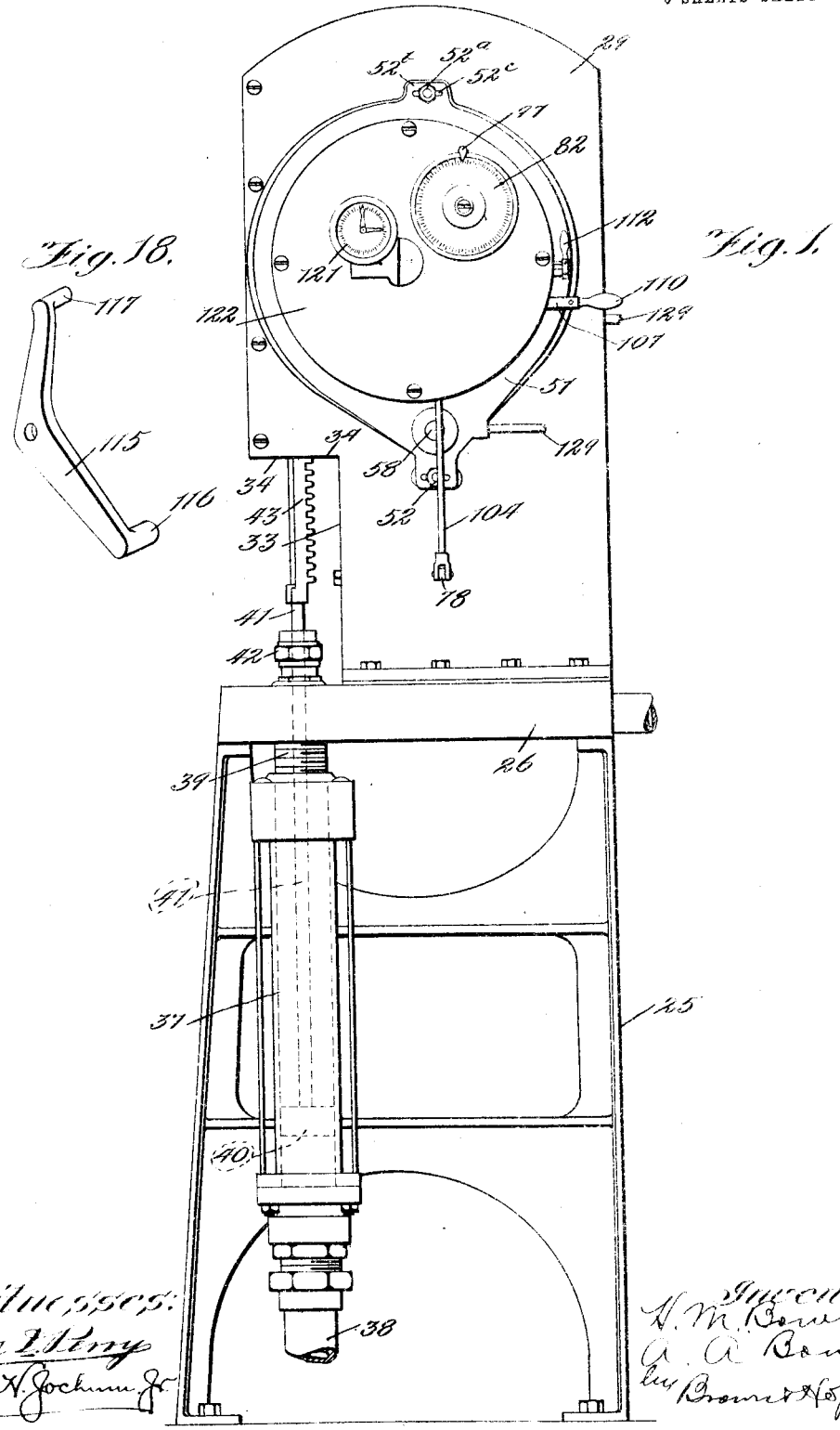

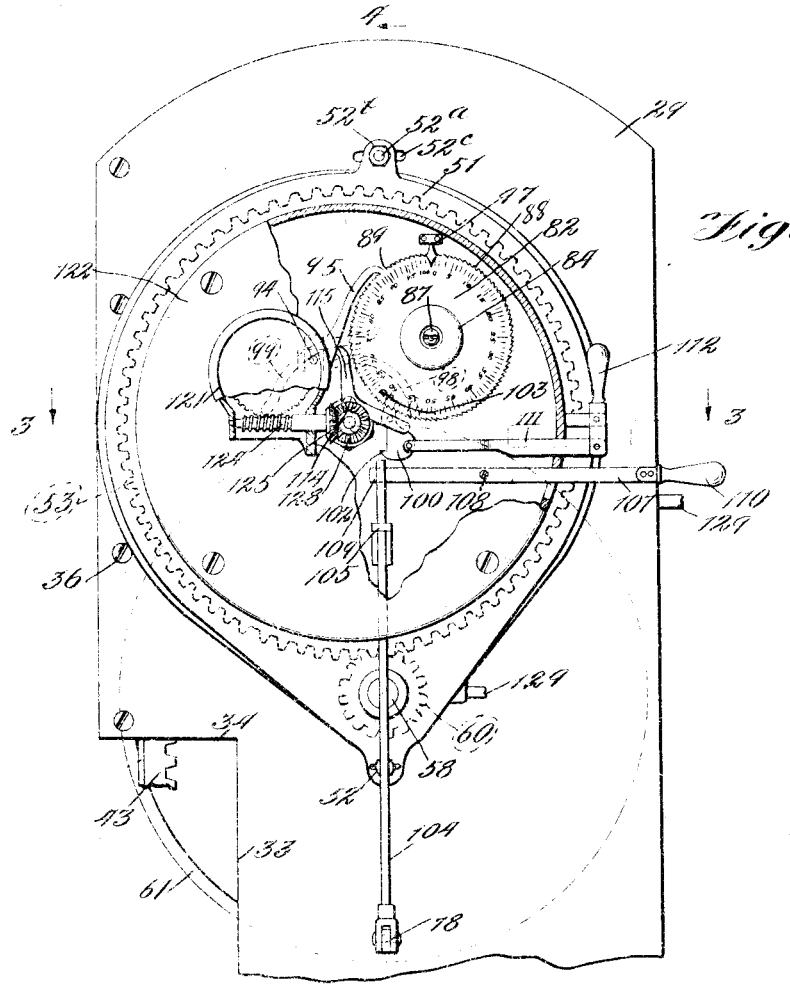
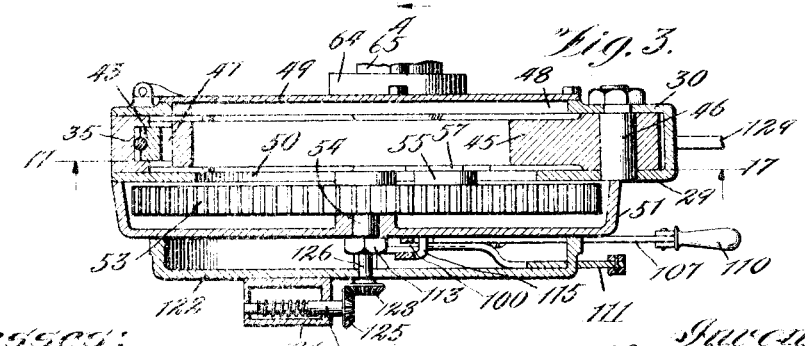

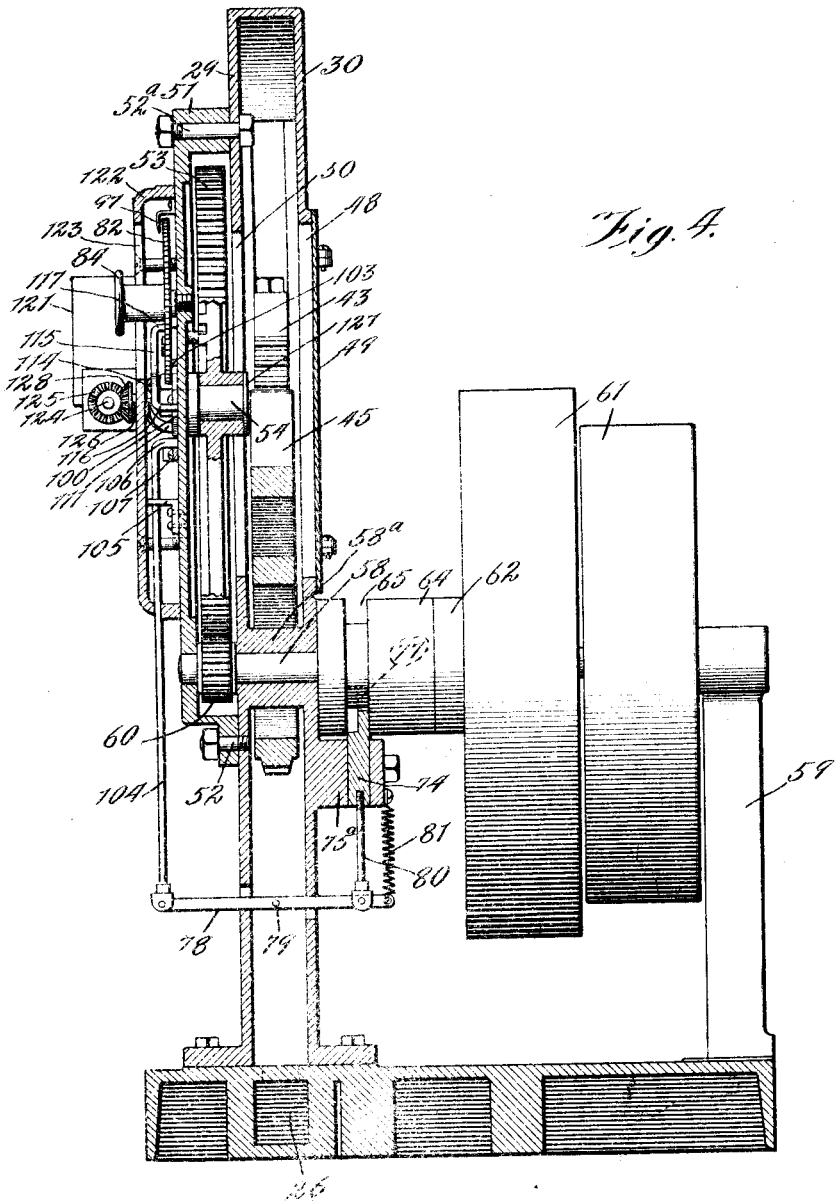

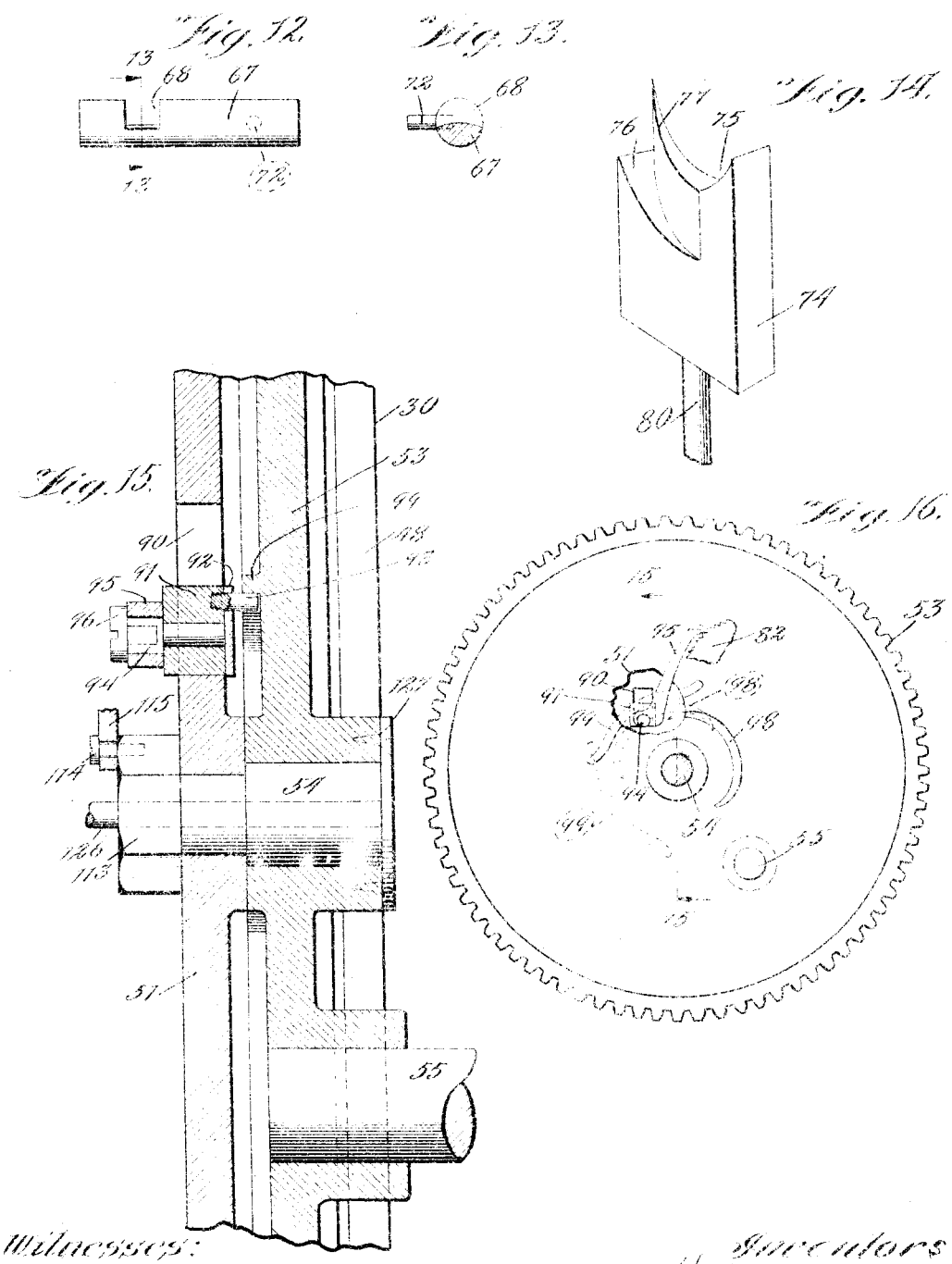

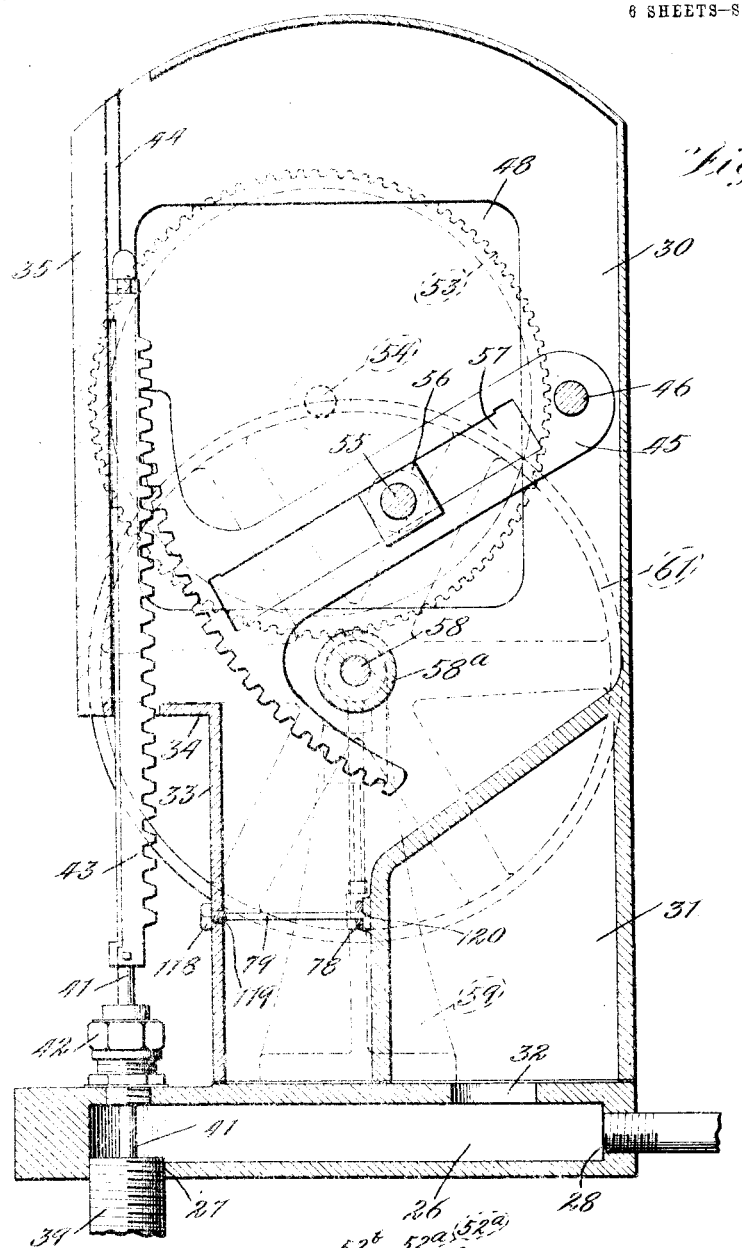
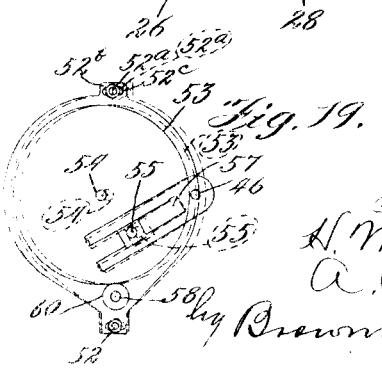

UNITED STATES PATENT OFFICE.

HARRY M. BOWSER AND ALLEN A. BOWSER, OF FORT WAYNE, INDIANA, ASSIGNORS TO S. F. BOWSER & CO., INC., OF FORT WAYNE, INDIANA, A CORPORATION OF INDIANA.

MEASURING-PUMP.

1,068,561.     Specification of Letters Patent.     Patented July 29, 1913.

Application filed February 13, 1907. Serial No. 357,135.

*To all whom it may concern:*

Be it known that we, HARRY M. BOWSER and ALLEN A. BOWSER, citizens of the United States, residing at Fort Wayne, in the county of Allen and State of Indiana, have invented certain new and useful Improvements in Measuring-Pumps, of which the following is a specification.

This invention relates to improvements in measuring pumps and the primary object of the same is to provide an improved device of this character for pumping or measuring a predetermined amount of liquid.

A further object is to provide improved means for setting the pump to pump a predetermined amount of liquid and improved means for automatically checking or stopping the pump when the desired amount has been pumped.

A further object is to provide improved means for varying the stroke of the piston of the pump.

A further object is to provide an improved device of this character which will be simple, compact and durable in construction, cheap to manufacture and efficient and effective in operation.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of the invention and in which:—

Figure 1 is a front elevation of a pump of this character constructed in accordance with the principles of this invention. Fig. 2 is an enlarged detail view partly in section and with a portion of the gear casing broken away. Fig. 3 is a sectional view on line 3—3 of Fig. 2. Fig. 4 is a sectional view on line 4—4 of Fig. 2. Fig. 5 is a detail view of the dial for setting the pump and a portion of the mechanism for releasing or throwing the pump out of operation. Fig. 6 is a sectional view on line 6—6 of Fig. 5. Fig. 7 is a view partly in section of one of the clutch members. Fig. 8 is a view similar to Fig. 7 of the other clutch member. Fig. 9 is a front elevation of Fig. 8. Fig. 10 is a view partly in section of the two clutch members assembled and the locking means for securing these parts to rotate together. Fig. 11 is a sectional view on line 11—11 of Fig. 7. Fig. 12 is a detail view of the clutch locking bolt. Fig. 13 is a sectional view on line 13—13 of Fig. 12. Fig. 14 is an enlarged detail perspective view of the wedge or member for releasing or unlocking the clutch members. Fig. 15 is an enlarged sectional view on line 15—15 of Fig. 16. Fig. 16 is an enlarged view showing the pawl for operating the dial, a portion of the support for the pawl and the means for operating the pawl. Fig. 17 is a sectional view on line 17—17 of Fig. 3. Fig. 18 is a detail view of the releasing lever. Fig. 19 is a view in diagram showing the relative positions of the center of the gear and the point of pivotal support of the segment, both in their normal and adjusted positions.

Referring more particularly to the drawings, the same reference numerals designate similar parts throughout the several views and in this exemplification of the invention, the numeral 25 designates a suitable supporting frame or base, in the top of which is located a suitable chamber 26 having an inlet opening 27 and an outlet or discharge opening 28.

A suitable casing, comprising a front wall 29 and a rear wall 30, is supported by the base 25 and preferably over the chamber 26, and located within this casing is a chamber 31 which has communication with the chamber 26 through a suitable aperture 32. The lower portion of one side of the casing is preferably reduced as at 33 to form an offset portion 34 and the side adjacent the offset portion is preferably open and is adapted to be closed by a suitable closure 35, which may be inserted between the front and rear faces 29, 30, and is removably held in position in any suitable manner, such as by means of screws or bolts 36. A suitable pump 37 having a supply pipe 38 is secured by the end 39 to discharge into the chamber 26 through the inlet opening 27 and movable within the pump is a piston 40, having a piston rod 41, which extends upwardly through the chamber 26 and a suitable packing or bushing 42, and said piston rod 41 projects beyond the packing or bushing 42.

Secured in any suitable manner to the free extremity of the piston rod 41 is a rack 43, preferably in the shape of a bar and said rack projects upwardly into the casing through the offset portion 34 and adjacent the open end of the casing. The closure 35 is preferably provided with a groove or recess 44 within which the rear face of the rack 43 and the piston 41 is adapted to move when reciprocated in a manner to be set forth. A toothed segment 45 is pivotally mounted by one end as at 46 within the casing and is so disposed that the teeth 47 thereon will engage and mesh with the teeth of the rack 43 so that when the segment is oscillated about its point of pivotal support in a manner to be set forth, the piston 40 will be reciprocated through the medium of the rack 43.

The segment 45 may be inserted within the casing in any suitable manner and access may be had through a suitable opening 48 in the rear face 30 of the casing and said opening may be closed by means of a suitable closure or hinged door 49. The front face 29 of the casing is also provided with an aperture 50, preferably in alinement with the aperture 48. A gear casing 51 is spaced from and removably secured to the face 29 of the segment casing by means of a bolt or screw 52, passing through the lower end thereof, and said bolt or screw serves as a pivotal support for the casing. The upper end of the casing is preferably held in position by means of a bolt or screw 52ª, which passes through a projecting ear 52ᵇ and a slot 52ᶜ so that when the bolts 52 and 52ª are loosened the gear casing 51 may be moved about its pivotal point of support 58 and held in its adjusted position by tightening the bolts 52 and 52ª for a purpose to be more fully set forth. This gear casing is so arranged as to cover the aperture 50 in the face 29.

A large gear wheel 53 is journaled to the rear face of the gear casing 51 by means of a suitable axle 54 and projecting laterally from the face of said gear is a crank pin 55, which is journaled in a bearing or box 56 and said bearing or box 56 is mounted for sliding movement in a slot 57 in the segment 45 so that when a rotary motion is transmitted to the gear 53, in a manner to be set forth, the crank pin 55 will cause the bearing 56 to slide in the slot 57 to reciprocate the segment 45 about its point of pivotal support 46.

One end of a shaft 58 passes through a suitable bearing 58ª in the segment casing and is journaled in the front face of the gear casing 51; the other end preferably projects beyond the segment casing and is rotatably mounted in a suitable support or standard 59. A gear wheel 60 is secured for rotation with the shaft 58 and is located within the gear casing 51 is such a position as to mesh with and drive the gear wheel 53 when the shaft 58 is rotated to impart motion to the segment 45.

Mounted for rotation upon the shaft 58 is a differential pulley 61 to which is secured one member 62 of a clutch and said member is provided with a recess or aperture 63 in the face thereof. A clutch member 64 is secured to the shaft 58 and said member is provided with a circumferential groove 65 and a longitudinal aperture or recess 66, which extends across and communicates with the circumferential groove 65, as shown more clearly in Fig. 7 of the drawings. Slidingly mounted in the recess or aperture 66 is a locking pin or bolt 67, which is provided adjacent one end with an open notch or recessed portion 68, one edge of which is slightly inclined or beveled as at 69, shown more clearly in Fig. 10 of the drawing. This pin or bolt 67 is of such a length that it may be entirely seated within the aperture or recess 66. The clutch member 64 is also provided with an aperture or recess 70, preferably of a smaller diameter than the diameter of the aperture or recess 66 and said aperture or recess 70 is arranged parallel with the aperture or recess 66 and has communication therewith by means of a slot 71, shown more clearly in Figs. 7, 10 and 11 of the drawings.

Projecting laterally from the pin or bolt 67, preferably adjacent the end opposite to the notch or recess 68, is a lug or pin 72 which projects through the connecting slot 71 and into the aperture or recess 70, the free end of said pin or lug being adapted to reciprocate in the recess or aperture 70 when the pin or bolt 67 is reciprocated in a manner to be set forth.

Disposed within the aperture or recess 70 and between the bottom thereof and the pin or lug 72 is a suitable yielding member 73, such as a coil spring or the like, and said member is adapted to exert its tension upon the pin or lug 72 to normally project the free end of the pin or bolt 67 beyond the end of the clutch member 64 so that said projecting end will enter the recess 63 in the face of the clutch member 62 when the recess 63 is in a position to receive said end, to lock the clutch members together so that the rotation of the pulley 61 will be imparted to the shaft 58.

A member 74 is mounted for sliding movement in a suitable support 75ª and the free end of said member is cut away as at 75 to form a semi-circular recessed portion for a purpose to be set forth. A portion of the upper end of said member 74 is cut away or reduced as at 76 to form a wedge-shaped portion 77. This member 74 is mounted in such a relation with respect to the clutch member 64 that the free extremity thereof will enter the circumferential groove 65 and the semi-circular portion 75 will surround the bottom of the circumferential groove 65.

A suitable lever 78 preferably extends transversely through the segment casing and is pivotally supported intermediate its ends, as at 79. One end of said lever is connected to the member 74 by means of the connection 80. A yielding member 81, such as a spring or the like, is secured by one end to the lever 78 and by its other end to the support 75ª and the normal tendency of said spring is to hold the member 74 seated within the circumferential groove 65 to maintain the clutch members 62, 64 unlocked with relation to each other. The clutch members are unlocked by withdrawing the pin or bolt 67 so as to be seated within the clutch member 64 against the compression of the yielding member 73. The notched or recessed portion 68 in the pin or bolt 67 is of such a size that when the pin or bolt is in its extreme forward or locking position, a portion of the notch or recess 68 will extend into and communicate with the circumferential groove 65. The clutch members being locked together and the member 74 being seated within the circumferential groove 65, a portion of the wedge-shaped part 77 will enter the notch or recess 68 and when the shaft 58 is rotated, the wedge-shaped portion 77 will engage the wall of the notch or recess 68 and withdraw the bolt or pin 67 against the compression of the spring 73; the inclined portion 69 of the notch or recess permitting said wedge-shaped portion to readily enter therein.

The manner of locking the shaft to impart motion to the piston 40 having been described, the improved means for setting the pump to discharge a predetermined amount of liquid and also the improved means for automatically checking or stopping the pump will now be described.

A dial or indicator 82 is rotatively mounted upon and spaced from the face of the gear casing 51, preferably by means of a bolt 83. The dial or indicator is provided with an operating handle or projection 84 preferably provided with a recess 85 into which the extremity of the bolt 83 passes. A flexible member 86, such as a coil spring or the like, is disposed within the recess 85 and compression is exerted thereon in any suitable manner, such as by means of a screw 87, which enters the end of the bolt 83 and with its head engaging the spring 86 so as to cause the dial or indicator 82 to exert a frictional contact with the face of the gear casing 51. The dial or indicator 82 is provided with peripheral notches or teeth 88 and a flattened or smooth portion 89 for a purpose to be set forth.

The gear casing 51 is provided with an elongated slot or aperture 90 adjacent the dial or indicator 82, and mounted for sliding movement in said slot or aperture is a shouldered member or bearing 91, secured to the rear face of which is a plate 92 to prevent displacement of said member. A laterally projecting pin or lug 93 is secured to the rear face of said sliding member 91 in any suitable manner, such as being secured through the plate 92 and into the body of the member 91. A laterally projecting portion 94 extends beyond the front of said member 91 and pivotally supported by said projection 94 is a dog or pawl 95, the end of which is adapted to rest upon and engage the peripheral teeth 88 of the dial or indicator 82. This dog or pawl is held from displacement in any suitable manner, such as by means of a headed screw or bolt 96 entering the projection 94 in such a manner that the pawl will be held between the face of the member 91 and the head of the bolt 96. A pointer or finger 97 is arranged to project over the face of the dial or indicator 82. The teeth and the numbers on the dial or indicator are so arranged that when the latter is rotated by the pawl in a manner to be set forth, the numbers appearing under the finger or pointer will decrease; that is, assuming any one of the numbers to be under the finger or pointer 97 and the dial or indicator is moved one notch, the next figure appearing under the finger or pointer will be one denomination lower and so on. The flattened portion 89 is so related to the characters and to the end of the pawl 95 that when the zero character is directly under or indicated by the finger or pointer 97, the operating extremity of the pawl will rest upon the said flattened portion.

Projecting laterally from the face of the gear wheel 53 is a cam-shaped portion 98, which is adapted to pass under the pin or projection 93 on the member 91 as the gear 53 is rotated to raise said member, thereby imparting motion to the pawl 95, which will move the dial or indicator 82 forwardly one notch each time the member 91 is raised. After the cam-shaped portion 98 has passed out of contact with the pin 93 the pawl will be returned to normal position by gravity. In order to insure a positive return of the pawl so as to be in position to move the dial or indicator 82 forwardly another notch, a cam-shaped portion 99 may also be provided on the face of the gear 53 in proximity to the cam-shaped portion 98 and in such a position that it will pass over the projecting pin or lug 93 and draw the member 91 and the pawl 95 downwardly to its normal position.

A latch or dog 100 is pivotally supported intermediate its ends as at 101 to the face of the gear casing 51 and in such a position with respect to the dial or indicator 82 that one extremity thereof will pass behind said dial or indicator. The other extremity of the latch or dog 100 is provided with a shoulder or projection 102, and projecting laterally from the rear face of the dial or indicator 82 and preferably adjacent the periphery thereof is a pin or lug 103 and said pin or lug is so related to the end of the dog or latch 100 as to engage said end and rock the dog or latch about its point of pivotal support 101 at a predetermined time when the dial or indicator 82 is rotated, as will be set forth.

Pivotally connected to the free end of the lever 78 is a bar or member 104. The end of this bar or member 104 is adapted for sliding movement through a suitable guide or support 105 which latter is preferably secured to the face of the gear casing 51. The extremity 106 is laterally deflected and is adapted to stand in close proximity to the face of the gear casing 51. When the bar 104 is raised, the lever 78 will be rocked to draw the member 74 out of operative position so as to permit the clutch members to be locked together and said bar 104 is of such a length that when the member 74 is out of operative position, the deflected extremity 106 thereof will be in a position to permit the shoulder or projection 102 of the dog 100 to pass thereunder and hold the said bar raised until the dog 100 is rocked to disengage the shoulder 102 from the extremity 106 by means of the projection or lug 103 on the dial or indicator 82 and when so released the spring 81, through the medium of the connecting parts will return the rod or bar 104 and the member 74 to their normal positions.

Any suitable means may be provided for raising the bar 104 so as to lock the pump into operating position but a simple and effective means for accomplishing this purpose comprises a lever 107, which may be pivotally supported, as at 108, to the gear casing 51. One extremity 109 thereof, stands in close proximity to the deflected extremity 106 of the bar or rod 104 and when the lever 107 is depressed by means of a suitable handle 110 the adjacent end 109 thereof will engage the deflected portion 106 and raise the rod to permit the shoulder or projection 102 on the dog or latch 100 to pass thereunder, the extremity 109 of said lever 107 being preferably deflected, as shown more clearly in Fig. 6, so as not to interfere with or engage the dog or latch 100 when raised.

It is thought that the operation of this portion of the machine will be clearly understood from the above description but briefly stated, it is as follows: The pump being connected up to any suitable source of supply and the clutch members being unlocked and motion being transmitted to the pulley 61, the machine is ready for operation. The operator then sets the dial or indicator 82 by means of the handle 84 in such a manner that the amount thereon designating the desired quantity will be directly under the pointer or finger 97. He then depresses the lever 107 which will raise the bar 104, rock the lever 78, and withdraw the member 74 against the tension of the spring 81, thereby permitting the pin or bolt 67 to lock the clutch members together, motion being then imparted to the shaft 58, the segment 45 will be oscillated about its point of pivotal support through the medium of the connecting gears 60 and 53 and the crank pin 55 and sliding box or bearing 56. The oscillation of the segment will move the pump piston up and down, and will discharge the liquid into the chamber 26, a portion of said liquid entering the chamber 31 through the aperture 32 to compress the air in said latter chamber so that the liquid will be forced out of the discharge opening 28 as the piston returns. On each complete rotation of the gear wheel 53, the cam 98 thereon will engage the projecting pin or lug 93 on the member 91 and operate the pawl 95 to move the indicator or dial 82 one step of rotation. This operation will continue until the lug or projection 103 on the dial engages the free end of the latch or dog 100 to rock the same about its point of pivotal support and disengage the shoulder or projection 102 thereon from the deflected extremity 106 of the bar or rod 104. Immediately upon being thus disengaged the rod will be drawn downwardly by the spring 81 and the member 74 will be reseated to unlock the clutch members 62, 64.

It may be desired to raise the pawl 95 out of engagement with the dial or indicator 82 so as to set the latter without making a complete rotation thereof and it may also be desired to release or trip the dog or latch 100 before the pin or projection 103 engages therewith. A suitable means for simultaneously tripping the pawl 95 and the dog or latch 100 comprises a bar or member 111, one end of which is pivotally connected to the dog or latch 100 and secured to the other end is an operating handle 112. A nut 113 is secured to the front end of the axle 54 to prevent displacement of said axle and projecting forwardly from said nut is a pin or stud 114. Pivotally mounted on said pin or stud 114 is a bell crank lever 115, one arm of which extends into close proximity with the dog or latch 100 and is provided with a deflected extremity 116 adapted to project over and stand behind the dog or latch 100 at a point below its pivotal support. The end of the other arm of the bell crank lever terminates adjacent the pawl 95 and is deflected as at 117 to stand in close proximity to the lower face of said pawl so that when the handle 112 is moved to rock the dog or latch 100, said dog or latch will engage the adjacent deflected portion 116 of the bell crank lever 115 and rock the same about its pivot 114 to cause the deflected end 117 to engage and raise the dog 95 and when the parts are in this position, it will be seen that the dial or indicator 82 may be freely rotated in either direction.

The gear casing 51 is adapted to be moved about its point of pivotal support 52 by loosening the bolt 52$^a$ which latter is adapted to move in the slot 52$^c$. The gear 53, together with the dial or indicator 82 and its associated parts, being mounted upon the gear casing 51, will move with the casing and in so moving the gear 53, the position of its center will vary with relation to the point of pivotal support 46 of the segment 45 so as to regulate or vary the movement of oscillation of the segment 45, as shown more clearly in diagram in Fig. 19. This adjustment will also regulate the stroke of the piston and control the amount of liquid raised by the piston on each stroke thereof. The object for thus adjusting the parts to vary the stroke of the piston while the operation of the indicating, or predetermining, means remains constant, is, that when some oils are sold to the dispenser it is sold by weight, and the same quantity of oil in bulk is not always delivered which is due to different consistencies and other reasons. Therefore, if the dispenser should dispense the same quantity of oil in bulk for, say a gallon, when a full gallon in bulk has not been received, there would be a loss to the dispenser. By the provision of this arrangement, the parts may be so adjusted that the piston will discharge on its stroke, the same relative amount for a gallon as was received by the dispenser, and this is also possible without varying or altering the movement of the pump driving mechanism. Furthermore, the parts may be thus accurately adjusted during the assembling of the pump, so that allowance can be made for any irregularities in the manufacture of the parts.

The pivot 79 for the lever 78 may be formed in any desired or suitable manner but preferably comprises a pin or bolt having a headed end 118 and a threaded portion 119 adjacent the head. This bolt is adapted to be inserted through the side 33 of the segment casing so that the threaded portion 119 will engage a suitable threaded aperture therein and with its extremity 120 passing through the lever 78 and being seated in a suitable bearing in one of the walls of the chamber 31.

A suitable cyclometer, designated generally by the reference numeral 121 may be provided for registering the total amount of liquid pumped and is preferably secured to a suitable cover 122, which is adapted to be placed over the operating parts and is provided with a suitable aperture 123, through which the dial or indicator 82 is exposed. The cyclometer may be provided with an operating worm shaft 124, which projects beyond the side of the casing and secured to the projecting extremity is a gear wheel 125. Passing through the axle 54 of the gear wheel 53 is a shaft 126 which is secured for rotation with the gear wheel 53 in any suitable manner, preferably by means of a head 127 on the end of the shaft which rests against and is secured to the inner face of the hub of the gear wheel. The forward extremity of the shaft 126 projects beyond the front of the gear casing 51 and the nut 113. A beveled gear wheel 128 is secured to the free extremity of the shaft 126 and meshes with and is adapted to drive the gear wheel 125 on the cyclometer shaft 124. The cyclometer 121 may be of any approved style, the specific construction of which forms no part of the present invention.

If desired, suitable pipes or tubes 129 may be provided which lead to the various bearings and through which suitable lubrication may be supplied.

In order that the invention might be fully understood, the details of an embodiment thereof have been thus specifically described.

What we claim is:—

1. In a device of the class described, the combination of a pump including a piston, an oscillating member for operating the piston, an operative connection between said member and piston, a rotary member operatively connected with the first said member for oscillating the member, mechanism for rotating the second said member including means for coupling the mechanism with the said rotary member, and means operatively related to the said rotary member for releasing the said operating mechanism at a predetermined time.

2. In a device of the class described, the combination of a pump including a piston, an oscillating member for operating the piston, an operative connection between said member and piston, a rotary member operatively connected with the first said member for oscillating the member, means for transmitting motion to said rotary member including clutch members for coupling said means with the rotary member, and means for releasing the clutch members at a predetermined time including means operatively related to the said rotary member.

3. In a device of the class described, the combination of a pump including a piston, an oscillating member for operating the piston, an operative connection between the member and piston, a rotary member operatively connected with the oscillating member for oscillating the latter, means for operating said rotary member including coupling means, means for normally holding said coupling means out of operative position, means for holding the last said means out of operative position, and means operatively related to said rotary member for releasing said holding means to permit said coupling means to assume an inoperative position.

4. In a device of the class described, the combination of a pump including a piston, means for operating the piston, means for transmitting motion to the operating means including means for coupling the two said means together, means for normally holding said coupling means out of operative position, means for holding the last said means out of operative position, means operatively related to the pump operating means for automatically releasing the coupling controlling means to permit said coupling to assume an inoperative position, and means for causing the coupling means to assume an operative position when its respective controlling means is held out of operative position.

5. In a device of the class described, the combination of a pump including a piston, oscillating means for operating the piston, an operative connection between said means and the piston, said oscillating means having a fixed pivot, rotary means for transmitting motion to said oscillating means, means for operatively coupling together the coöperating elements of the said rotary means, means for uncoupling the last said means, and means operatively related to the second said means for controlling the uncoupling means.

6. In a device of the class described, the combination of a pump including a piston, means for operating the piston, means for transmitting motion to the piston operating means, including clutch members, means for locking said members together, means for unlocking the members, yielding means for normally holding the last said means in operative position, means for securing the unlocking means out of operative position, and against the tension of the said holding means, and means operatively related to the piston operating means for releasing the securing means to permit the yielding means to return the unlocking means to its normal position.

7. In a device of the class described, the combination of a pump including a piston, means for operating the piston, means for transmitting motion to the operating means, including clutch members, yielding means for normally locking said members, means for moving the locking means to release the clutch members, means tending to normally hold the last said means in an operative position, means for holding the lock moving means out of operative position, and means operatively related to the piston operating means for releasing the said lock operating means.

8. In a device of the class described, the combination of a pump including a piston, means for operating the piston, means for transmitting motion to the operating means, including clutch members, a bolt, means for yieldingly holding said bolt to normally lock the members together, a member adapted to engage and move the bolt to unlock the members, means for yieldingly holding said member normally in an operative position; means for securing said member out of operative position and against the tension of the said holding means, and means operatively related to the piston operating means for releasing the last said member.

9. In a device of the class described, the combination of a pump including a piston, means for operating the piston, including clutch members, one of said members being provided with a circumferential groove, a spring controlled member mounted within one of the clutch members and adapted to normally engage the other clutch member for locking said members, said spring controlled member extending into the groove and being provided with a recess communicating therewith, a member, adapted to enter the groove and recess for withdrawing the spring controlled member, and means operatively related to the pump operating means for controlling the last said member.

10. In a device of the class described, the combination of a pump including a piston, means for operating the piston, including clutch members, one of said members being provided with a circumferential groove, a spring controlled member mounted within one of the clutch members and adapted to normally engage the other clutch member for locking said members, said spring controlled member extending into the groove and being provided with a recess communicating therewith, a member, adapted to enter the groove and recess for withdrawing the spring controlled member, means for locking said member out of operative position, means operatively related to the piston operating means for releasing said member and means for moving said member into operative position when released.

11. In a device of the class described, the combination of a pump including a piston, means for operating the piston including clutch members, one of said members being provided with a circumferential groove, a spring controlled member mounted within one of the clutch members and adapted to normally engage the other clutch member for locking said members, said spring controlled member extending into the groove and being provided with a recess communicating therewith, a member provided with a wedge-shaped portion, said portion being adapted to enter the groove and recess for withdrawing the spring controlled member, means for locking said member out of operative position, means operatively related to the piston operating means for releasing said member and means for moving said member into operative position when released.

12. In a device of the class described, the combination of a pump, a piston, means for operating the piston including clutch members, a spring controlled bolt mounted for sliding movement in one of the clutch members and adapted to normally engage the other member for locking the same, said bolt being provided with a recess, and one of said clutch members being provided with a circumferential groove with which the recess communicates; a wedge-shaped member, means for seating the member within the groove to cause the same to engage in the recess and withdraw the bolt to unlock the clutch members when the latter are rotated, means for locking said member out of operative position and against the tension of the seating means, and means under the control of the piston operating means for releasing said locking means.

13. In a device of the class described, the combination of a pump including a piston, means for operating said piston including clutch members, means for locking said members, an indicator, means operatively related to the pump operating means for operating the indicator, a member for unlocking the clutch members, yielding means for normally holding said member in operative position, means for locking said member out of operative position and against the tension of said yielding means, said means including a pivoted dog and a member operatively related to the unlocking member and adapted to be engaged by the dog, and means operatively related to the indicator adapted to engage and rock the dog to disengage the member and permit the clutch unlocking member to assume an operative position.

14. In a device of the class described, the combination of a pump including a piston, means for operating the piston including clutch members, means for locking said members, means for unlocking the members, an indicator provided with teeth, a reciprocating pawl directly engaging said teeth, means other than the piston operatively related to the piston operating means for positively moving the pawl to operate the indicator, means also operatively related to the piston operating means for returning the pawl, means for securing the clutch unlocking means out of operative position including a member operatively related to the last said means and a dog adapted to engage therewith, and means operatively related to the indicator adapted to engage and move the dog to release the securing means when the indicator has moved a predetermined distance.

15. In a device of the class described, the combination of a pump including a piston, means for operating the piston, including clutch members, means for locking said members, means for unlocking the members, an indicator provided with teeth, a pawl, means operatively related to the piston operating means for moving the pawl to operate the indicator, means for securing the clutch unlocking means out of operative position, including a member operatively related to the last said means and a dog adapted to engage therewith, means operatively related to the indicator adapted to engage and move the dog to release the securing means when the indicator has moved a predetermined distance, and separate means for operating the dog and pawl.

16. In a device of the class described, the combination of a pump including a piston, means for operating the piston, including clutch members, means for locking and means for unlocking said members, a rotary indicator provided with operating teeth and an interposed smooth space, a pawl adapted to engage the teeth to operate the indicator, means for securing the clutch unlocking means out of operative position, said means including a member operatively connected to the unlocking means, a pivoted dog adapted to engage said member, means operatively related to the piston operating means for moving the pawl to operate the indicator and means operatively related to the indicator adapted to engage and trip the dog, said pawl being adapted to engage and rest upon the smooth space when the indicator has assumed a zero position.

17. In a device of the class described, the combination of a pump including a piston, means for operating the piston, including clutch members, means for locking and means for unlocking said members, a rotary indicator provided with operating teeth and an interposed smooth space, a pawl adapted to engage the teeth, to operate the indicator, means for securing the clutch unlocking means out of operative position, said means including a member operatively connected to the unlocking means, a pivoted dog adapted to engage said member, means operatively related to the piston operating means for moving the pawl to operate the indicator, means operatively related to the indicator adapted to engage and trip the dog, said pawl being adapted to engage and rest upon the smooth space when the indicator has assumed a zero position and separate means for simultaneously tripping said pawl and dog.

18. In a device of the class described, the combination of a pump including a piston, means for operating the piston, including clutch members, means for locking and means for unlocking said members, an indicator provided with operating teeth, a support, a pawl mounted for sliding movement on the support, means operatively related to the piston operating means for engaging and moving the pawl to operate the indicator, separate means operatively related to the piston operating means for returning the pawl to its normal position, means for locking the clutch unlocki  means out of operative position and means operatively related to the indicator for releasing the last said means.

19. In a device of the class described, the combination of a pump including a piston, means for operating the piston, including clutch members, means for locking and means for unlocking said members, an indicator provided with operating teeth, a support, a pawl mounted for sliding movement on the support, a cam operatively related to the piston operating means for engaging and moving the pawl to operate the indicator, a separate cam also operatively related to the piston operating means for returning the pawl to its position, means for locking the clutch unlocking means out of operative position and means operatively related to the indicator for releasing the last said means.

20. In a device of the class described, the combination of a pump including a piston, means for operating the piston including clutch members, means for securing said members together, means for releasing the members, a rotary indicator provided with peripheral teeth, a support, a gravity pawl mounted for sliding movement on the support, said pawl normally engaging the teeth on the indicator, a projection on the pawl, means operatively related to the piston operating means adapted to pass under the projection for operating the pawl to move the indicator, and means operatively related to the indicator for controlling the clutch releasing means when the indicator has moved to predetermined distance.

21. In a device of the class described, the combination of a pump including a piston, means for operating the piston, including a gear wheel, means for transmitting motion to the gear, including clutch members, means for operatively securing the clutch members together, a rotary indicator provided with operating teeth, a support, a pawl normally engaging the teeth and mounted for sliding movement on the support, a projection on the pawl, a cam operatively related to the gear and adapted to pass under the projection to move the pawl and operate the indicator, a second cam operatively related to the gear and adapted to pass over and engage the projection to move the pawl in the opposite direction, and means operatively related to the indicator for releasing the clutch members when the indicator has moved a predetermined distance.

22. In a device of the class described, the combination of a pump including a piston, means for operating the piston including a gear wheel, means for operating the gear wheel including clutch members, means for locking said members, a rotary indicator, a support, a pawl bodily movable on the support adapted to operate the indicator, means operatively related to the gear for moving the pawl, a clutch releasing member, means for holding said member in a position to hold the clutch members normally released, a bar operatively related to the last said means for moving the clutch releasing member out of operative position, interengaging means on the support and bar for locking said member out of operative position, and means operatively related to the indicator adapted to disengage the last said means when the indicator has moved a predetermined distance.

23. In a device of the class described, the combination of a pump including a piston, means for operating the piston including a gear wheel, means for operating the gear wheel including clutch members, means for locking said members, a rotary indicator, a support, a pawl bodily movable on the support adapted to operate the indicator, means operatively related to the gear for moving the pawl, a clutch releasing member, means for holding said member in a position to hold the clutch members normally released, a bar operatively related to the last said means for moving the clutch releasing member out of operative position, a projection on the bar, a dog pivotally mounted on the support and adapted to engage the projection for locking the clutch releasing member out of operative position, and a projection on the indicator adapted to engage and move the dog for releasing the clutch operating member when said indicator has moved a predetermined distance.

24. In a device of the class described, the combination of a pump including a piston, means for operating the piston including a gear wheel, means for operating the gear wheel including clutch members, means for locking said members, a rotary indicator, a support, a pawl bodily movable on the support adapted to operate the indicator, means operatively related to the gear for moving the pawl, a clutch releasing member, means for holding said member in a position to hold the clutch members normally released, a bar operatively related to the last said means for moving the clutch releasing member out of operative position, a guide for said bar, one end of the bar being laterally deflected, a dog pivotally mounted on the support and adapted to engage the deflected portion for locking the clutch releasing member out of operative position, and a projection on the indicator adapted to engage the dog to release the last said member.

25. In a device of the class described, the combination of a pump including a piston, means for operating the piston including a gear wheel, means for operating the gear wheel including clutch members, means for locking said members, a rotary indicator, a support, a pawl bodily movable on the support adapted to operate the indicator, means operatively related to the gear for moving the pawl, a clutch releasing member, means for holding said member in a position to hold the clutch members normally released, a bar operatively related to the last said means for moving the clutch releasing member out of operative position, one end of the bar being laterally deflected, an operating member adapted to engage the deflected portion to shift the bar and move the clutch releasing member out of operative position, means adapted to engage the bar to lock the same in its shifted position, and means operatively related to the indicator for tripping the last said means to release the clutch operating member.

26. In a device of the class described, the combination of a pump including a piston, means for operating the piston including a gear wheel, means for operating the gear wheel including clutch members, means for locking said members, a rotary indicator, a support, a pawl bodily movable on the support adapted to operate the indicator, means operatively related to the gear for moving the pawl, a clutch releasing member, means for holding said member in a position to hold the clutch members normally released, a bar operatively related to the last said means for moving the clutch releasing member out of operative position, one end of the bar being laterally deflected, an operating member adapted to engage the deflected portion to shift the bar and move the clutch releasing member out of operating position, a pivoted dog adapted to engage said deflected portion when the bar is shifted to lock the clutch releasing member out of operative position, and a projection on the indicator adapted to engage and rock the pawl to release the clutch releasing member when the indicator is moved a predetermined distance.

27. In a device of the class described, the combination of a pump including a piston, means for operating the piston, including a gear wheel, means for operating the gear wheel, including clutch members, means for locking said members, a rotary indicator, a support for the indicator, a pawl bodily movable on the support adapted to operate the indicator, means operatively related to the gear, adapted to engage and move the pawl to operate the indicator, a clutch releasing member, means for holding said member normally in operative position, means operatively related to the last said means for moving the clutch releasing member out of operative position, a member adapted to engage and shift the last said means, a pivoted dog adapted to coöperate with the last said means for locking the clutch releasing member out of operative position, means operatively related to the indicator, adapted to trip the dog to release the last said member, and separate means operatively related to the dog and pawl for moving the same out of operative position.

28. In a device of the class described, the combination of a pump including a piston, means for operating the piston, including a gear wheel, means for operating the gear wheel, including clutch members, means for locking the members, a rotary indicator, a support for the indicator, a pawl bodily movable on the support adapted to operate the indicator, means operatively related to the gear, adapted to engage and move the pawl to operate the indicator, a clutch releasing member, means for holding said member normally in operative position, means operatively related to the last said means for moving the clutch releasing member out of operative position, a member adapted to engage and shift the last said means, a pivoted dog adapted to coöperate with the last said means for locking the clutch releasing member out of operative position, means operatively related to the indicator, adapted to trip the dog to release the last said member, separate means for tripping the dog, and means operatively related to the dog and pawl for moving the latter out of operative position when the dog is tripped by the last said means.

29. In a device of the class described, the combination of a pump including a piston, means for operating the piston, including a gear wheel, means for operating the gear wheel, including clutch members, means for locking said members, a rotary indicator, a support for the indicator, a pawl bodily movable on the support adapted to operate the indicator, means operatively related to the gear, adapted to engage and move the pawl to operate the indicator, a clutch releasing member, means for holding said member normally in operative position, means operatively related to the last said means for moving the clutch releasing member out of operative position, a member adapted to engage and shift the last said means, a pivoted dog adapted to coöperate with the last said means for locking the clutch releasing member out of operative position, means operatively related to the indicator, adapted to trip the dog to release the last said member, separate means for tripping the dog, and a pivoted member operatively related to the dog and pawl, said member being adapted to move the pawl out of operative position when the dog is tripped by the last said means.

30. In a device of the class described, the combination of a pump including a piston, means for operating the piston, including a gear wheel, means for operating the gear wheel, including clutch members, means for locking said members, a rotary indicator, a support for the indicator, a pawl bodily movable on the support adapted to operate the indicator, means operatively related to the gear, adapted to engage and move the pawl to operate the indicator, a clutch releasing member, means for holding said member normally in operative position, means operatively related to the last said means for moving the clutch releasing member out of operative position, a member adapted to engage and shift the last said means, a pivoted dog adapted to coöperate with the last said means for locking the clutch releasing member out of operative position, means operatively related to the indicator, adapted to trip the dog to release the last said member, separate means for tripping the dog, a member pivotally supported between the ends, the ends thereof being located respectively adjacent the dog and pawl, the extremities of said ends being laterally deflected, one of said extremities being adapted to be engaged by the dog when the latter is tripped by the last said means to rock the member and cause the other extremity to engage and move the pawl out of operative position.

31. In a device of the class described, the combination of a pump including a piston, a pivoted segment for operating the piston, a connection between the piston and segment, a gear wheel, an operative connection between the gear wheel and the segment, means for transmitting motion to the gear wheel, including a clutch, means for locking the clutch, an indicator, means operatively related to the gear wheel for moving the indicator, means for releasing the clutch, and means operatively related to the indicator for controlling the clutch releasing means.

32. In a device of the class described, the combination of a pump, including a piston, a pivoted segment for operating the piston, a connection between the segment and piston, a bearing mounted for sliding movement on the segment, a gear wheel, a crank pin on said wheel, said pin being journaled in the bearing, means for rotating the gear wheel, including a clutch, means for locking the clutch, means for releasing the clutch, an indicator, means operatively related to the gear for moving the indicator, and means operatively related to the indicator for controlling the clutch releasing means.

33. In a device of the class described, the combination of a pump including a piston, a pivoted segment for operating the piston, a connection between the segment and piston, a bearing mounted for sliding movement on the segment, a gear wheel, a crank pin on the gear wheel, said pin being journaled in the bearing, means for rotating the gear including a clutch, means for locking the clutch, a rotary indicator, provided with operating teeth, a bodily movable gravity pawl engaging the teeth, a cam on the gear adapted to engage and move the pawl to operate the indicator, a clutch releasing member, and means operatively related to the indicator for controlling the clutch releasing member when the indicator has moved a predetermined distance.

34. In a device of the class described, the combination of a pump including a piston, a pivoted segment for operating the piston, a connection between the segment and piston, a bearing mounted for sliding movement on the segment, a gear wheel, a crank pin on the gear wheel, said pin being journaled in the bearing, means for rotating the gear including a clutch, a rotary indicator, provided with operating teeth, a bodily movable pawl engaging the teeth, a cam on the gear adapted to engage and move the pawl to operate the indicator, a second cam on the gear adapted to engage and move the pawl to its normal position, a clutch releasing member, and means operatively related to the indicator for controlling the clutch releasing member when the indicator has moved a predetermined distance.

35. In a device of the class described, the combination of a pump including a piston, a support, means pivotally secured to the support for operating the piston, a connection between the last said means and the piston, a bearing mounted for sliding movement on the said means, a second support, a gear wheel journaled thereon, a crank pin on the gear, said pin being journaled in the bearing, means for transmitting motion to the gear, and means permitting the shifting of the center of the gear with relation to the point of pivotal support of the first said means to vary the stroke of the piston.

36. In a device of the class described, the combination of a pump including a piston, a support, means pivotally secured to the support for operating the piston, a connection between said pivoted means and the piston, a second support, a gear journaled on the second support, a sliding connection between the gear and the first said means for transmitting motion to the latter, means for operating the gear, and means permitting the adjustment of the position of one of the supports with relation to the other support, to shift the center of the gear with relation to the point of pivotal support of the piston operating means to vary the stroke of the piston.

37. In a device of the class described, the combination of a pump including a piston, a support, a means pivotally secured to the support for oscillating movement, an operative connection between said means and the piston, a second support pivotally mounted upon the first said support, a gear journaled on the second support, a sliding connection between the gear and the first said means for transmitting motion to the latter, and means for permitting the adjustment of the second support about its pivot with relation to the first said support and for retaining the same in its adjusted position to shift the center of the gear with relation to the point of pivotal support of the first said means, to vary the movement of the said means.

38. In a device of the class described, the combination of a pump including a piston, a rack operatively related to the piston, a support, a toothed segment pivoted to the support and adapted to engage the rack, said segment being provided with an elongated aperture, a second support, a gear journaled to said second support, a crank pin on the gear, a bearing movable within the slot, said pin being journaled in the bearing, means for transmitting motion to the gear, and means permitting adjustment of one of the supports with relation to the other to shift the center of the gear with relation to the point of pivotal support of the segment to vary the movement of the segment.

39. In a device of the class described, the combination of a casing, a pump including a piston rod, said piston rod extending into the casing, a pivoted member within the casing, an operative connection between the member and the piston rod, said casing being provided with an aperture adjacent the member, a closure for the aperture, a gear mounted on the closure, an operative connection between the gear and the said member for oscillating the latter when the gear is rotated, means for transmitting motion to the gear, and means permitting adjustment of the center of the gear with relation to the point of pivotal support of the member to vary the stroke of the latter.

40. In a device of the class described, the combination of a casing, containing a chamber, a pump discharging into the chamber, said pump including a piston rod and said piston rod extending into the casing, a pivoted member within the casing, an operative connection between the member and the piston rod, said casing being provided with an aperture adjacent the member, a closure for the aperture, a gear mounted on the closure, an operative connection between the gear and the said member for oscillating the latter when the gear is rotated, means for transmitting motion to the gear, and means permitting adjustment of the center of the gear with relation to the point of pivotal support of the member to vary the stroke of the latter.

41. In a device of the class described, the combination of a casing, a pump, including a piston rod, said rod extending into the casing, a pivoted member within the casing for operating the piston rod and mounted for oscillating movement, said casing being provided with apertures in the walls thereof adjacent the member, closures for said apertures, a gear mounted upon one of the closures, a sliding connection between the gear and the pivoted member for oscillating the latter, means for transmitting motion to the gear, and means for permitting the adjustment of the last said closure to shift the center of the gear with relation to the point of pivotal support of the member to vary the movement of the latter.

42. In a device of the class described, the combination of a pump including a piston, means for operating the piston, including a clutch, means tending normally to lock the clutch members, an indicator, means for adjusting the indicator to a predetermined amount, means operatively related to the piston operating means for moving the indicator, a clutch releasing member, means operatively related to the indicator for controlling the clutch releasing member when the indicator has moved the predetermined distance, and separate means operatively connected with the piston operating means for indicating the operations of the piston operating means.

43. In a device of the class described, the combination of a pump including a piston, means for operating the piston, including a clutch, means tending normally to lock the clutch members, an indicator, means for adjusting the indicator to a predetermined amount, means operatively related to the piston operating means for moving the indicator, a clutch releasing member, means for locking said releasing member out of operative position, means operatively related to the indicator for controlling the locking means when the indicator has moved the predetermined distance and a cyclometer operatively related to the piston operating means.

44. In a self measuring pump, the combination of a driving member having a constant degree of motion, a pump including a piston, means operatively connecting the piston with said driving member embodying means whereby the connected parts may be relatively adjusted, without detaching them, for varying the stroke of the piston, while the degree of motion of the driving member remains constant, an indicator for indicating the amount to be discharged by the pump and with respect to the movement of which indicator the stroke of the piston may also be varied, and means operatively connecting the indicator with the driving member.

45. In a self measuring pump, the combination of a driving member having a constant degree of motion, a pump including a piston, means operatively connecting the piston with said driving member embodying means whereby the connected parts may be readily adjusted, without detaching them, for varying the stroke of the piston while the degree of motion of the driving member remains constant, an indicator for indicating the amount to be discharged by the pump and with respect to the movement of which indicator the stroke of the piston may also be varied, and means for indicating the amount pumped, operatively related to the pump and independent in its action of the variations produced by said means for varying the stroke of the piston.

46. In a self measuring pump, the combination of a driving member having a constant degree of motion, a pump including a piston, means operatively connecting the piston with said driving member embodying means whereby the connected parts may be relatively adjusted, without detaching them, for varying the stroke of the piston while the degree of motion of the driving member remains constant and means governed by said member for automatically controlling the movement of the member.

47. In a self measuring pump, the combination of a driving member having a constant degree of motion, a pump including a piston, means operatively connecting the piston with said driving member embodying means whereby the connected parts may be relatively adjusted, without detaching them, for varying the stroke of the piston while the degree of motion of the driving member remains constant, registering mechanism connected with said driving member for registering the amount discharged and with respect to the movement of which registering mechanism the stroke of the piston may also be varied.

48. In a self-measuring pump, the combination with means for operating said pump to discharge liquid therefrom, of means for predetermining the quantity to be discharged, means for automatically rendering the operating means ineffective when the predetermined quantity has been discharged, and means automatically actuated during the operation of the operating means for limiting the movement of the latter.

49. In a self-measuring pump, the combination with means for operating said pump to discharge liquid therefrom, of an adjustable device for predetermining the quantity to be discharged, means for automatically rendering the operating means ineffective when the predetermined quantity has been discharged, and means automatically actuated during the operation of the operating means for limiting the movement of the latter.

50. In a self-measuring pump, the combination with means for operating said pump to discharge liquid therefrom, of an indicating mechanism comprising a dial and a pointer for predetermining the quantity to be discharged, means for automatically rendering the operating means ineffective when the predetermined quantity has been discharged, and means automatically actuated during the operation of the operating means for limiting the movement of the latter.

51. In a self-measuring pump, the combination with means for operating said pump to discharge liquid therefrom, of means governed by the operating means for automatically controlling the extent of movement of the latter.

52. In a self-measuring pump, the combination with means for operating said pump to discharge liquid therefrom, of means for predetermining the quantity to be discharged, and means connected to the predetermining means and governed by the operating means for automatically controlling the extent of movement of the latter.

53. In a self-measuring pump, the combination with means for operating said pump to discharge liquid therefrom, of an indicating mechanism for predetermining the quantity to be discharged, and means connected to the indicating mechanism and governed by the operating means for automatically controlling the extent of movement of the latter.

54. In a self-measuring pump, the combination with means for operating said pump to discharge liquid therefrom, of means adjustable in different directions for predetermining the quantity to be discharged, and means for automatically rendering the operating means ineffective when the predetermined quantity has been discharged.

55. In a self-measuring pump, the combination with means for operating said pump to discharge liquid therefrom, of means actuated by the operating means for automatically controlling the extent of movement of the latter.

In testimony whereof we have signed our names to this specification, in the presence of two subscribing witnesses, on this 8th day of February A. D. 1907.

HARRY M. BOWSER.
ALLEN A. BOWSER.

Witnesses:
J. H. JOCHUM, Jr.
M. W. CANTWELL.